Figure 1:
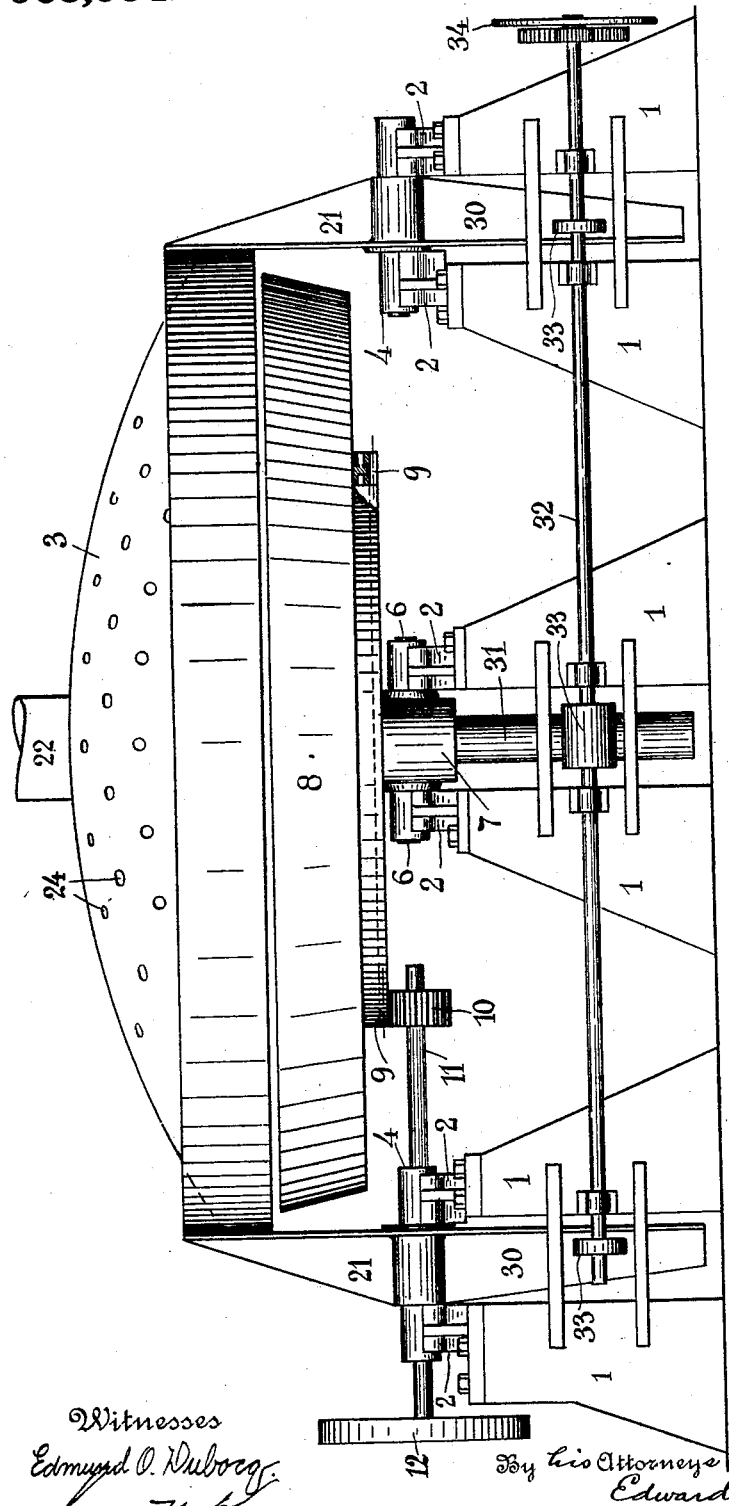

J. E. JONES.
METALLURGICAL FURNACE.
APPLICATION FILED MAY 7, 1908. RENEWED FEB. 4, 1910.

968,954.

Patented Aug. 30, 1910.
2 SHEETS—SHEET 1.

Witnesses
Edmund O. Duborg
Geo. N. Kerr

Inventor
John E. Jones,
By his Attorneys
Edwards, Sager & Wooster.

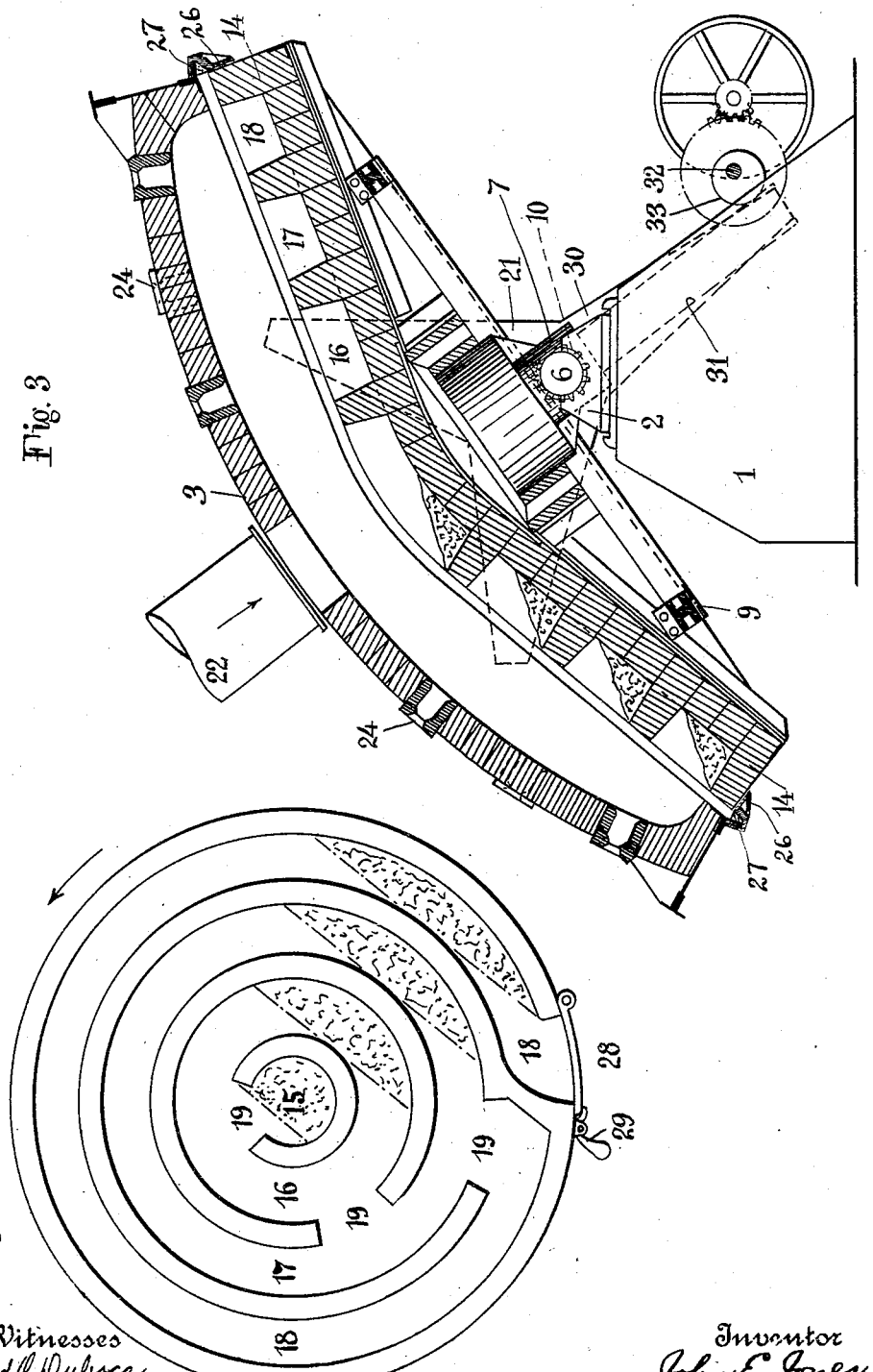

UNITED STATES PATENT OFFICE.

JOHN E. JONES, OF NEW YORK, N. Y.

METALLURGICAL FURNACE.

968,954.  Specification of Letters Patent.  Patented Aug. 30, 1910.

Application filed May 7, 1908, Serial No. 431,340. Renewed February 4, 1910. Serial No. 542,073.

*To all whom it may concern:*

Be it known that I, JOHN EMLYN JONES, a subject of the King of Great Britain, residing at New York, in the county of New York and State of New York, have invented certain new and useful Improvements in Metallurgical Furnaces, of which the following is a full, clear, and exact specification.

This invention relates to metallurgical furnaces, and more particularly has reference to furnaces for treating or sintering ores, flue dust, and other comminuted materials, preliminary to further treatment in a blast furnace or other reduction apparatus.

In processes of obtaining metals such as iron, zinc, copper and the like now in common use, large quantities of dust and material rich in metal, but too fine to be smelted, are obtained. Also, various metals occur in the form of ores which are so fine as to require sintering or nodulizing prior to being reduced.

This invention has for its object, the production of a furnace for the treatment of such materials whereby ores can be desulfurized, and also formed into nodules by partial fusion, and thereby rendered capable of economic treatment without undue loss in the blast furnace.

According to this invention, I have provided a furnace wherein the finely divided material to be treated is fed into the center of a rotary inclined hearth provided with a tortuous path such as a spiral, but more preferably with communicating grooves surrounding each other, the material dropping from one groove into the adjacent groove by gravity, as the hearth rotates, and in conjunction therewith, a relatively stationary hood is provided whereby to form a heating chamber inclosing the hearth. In conjunction therewith means is provided for applying heat to the interior of the furnace, and preferably, the heating means is so disposed as to direct a flame directly on the material undergoing treatment.

The invention further comprises a furnace of the general character above described wherein the hearth will be mechanically driven, and also mounted in such manner that the inclination of the hearth can be adjusted as may be desired without interfering with the arrangements for heating the interior, or with the driving means.

In the specific embodiment of the invention herein shown, the grooved hearth is made in the general form of a cone, that is to say, the grooves or channels containing the material being disposed in different planes, and the hearth itself being mounted on trunnions whose axis coincides with the axis of the driving shaft, thereby permitting the hearth together with the table to be swung on the trunnions to any desired angle and still maintain the driving connection.

The invention also comprises various improvements in the general arrangement of parts and in the details of construction, all of which will be more fully understood in connection with the description of the accompanying drawings, wherein—

Figure 1 is an elevation of an apparatus embodying the invention; Fig. 2 is a plan view of the rotary hearth carrying the material, and Fig. 3 is a vertical sectional view showing a construction of the hearth and hood, and the manner of adjusting the inclination.

1, 1, 1, represent supports or a foundation provided with bearings 2, 2, 2, 2 in which the hood 3 is pivotally supported, as by trunnions 4. The hood may be rotatable if desired. The middle support 1 in Fig. 1, carries similar bearings 2, 2 containing trunnions 6 carrying a bearing block 7. Rotatably supported in the bearing block 7 is a hearth 8. The hearth 8 is rotated by means of a rack 9 with which meshes a gear 10 mounted on a shaft 11 passing through one of the trunnions 4, the shaft 11 being driven by any suitable means, such as a pulley 12. It will be seen that the hearth 8 and hood 3 can be tilted in unison on the respective trunnions 4, 4 and 6, 6 to any desired angle without affecting the driving engagement of the rack 9 and gear 10.

The hearth 8, see Figs. 2 and 3, consists of a base, preferably conical in form, and covered with fire brick or other refractory material 14, this refractory material being formed so as to provide any number of grooves or channels 15, 16, 17, 18, surrounding one another, and each having openings as 19 from one into the adjacent one. It will be seen from Fig. 2 that the openings 19 are angularly displaced, and this is to cause the material discharged from one groove, to be discharged into the adjacent groove, so that it will require as many revolutions of the hearth to pass the material through the furnace as there are grooves or channels. The conical construction of hearth is stronger mechanically, and also permits a less inclination of the whole furnace, as well as continually varying the angle of inclination as it rotates.

The hood 3 consists of an arched roof supported at the ends by arms 21 carried by the trunnions 4, 4, or by the hearth, if the hood is to be rotatable, and also having a chute 22 through which the material to be treated will be fed into the innermost space or groove 15 of the hearth 8. The chute 22 also forms a vent for the escape of the gases formed during the treatment of the ore or other material. The lower right hand quadrant of the hood 3 will be provided with burners 24, arranged so that all parts of the various masses of material contained in the grooves of the hearth will be subjected to the direct action of the flames. In the types of rotary kiln furnaces commonly used, the refractory material or lining subjected to a very intense direct heat deteriorates very rapidly, due to the tendency of the material to adhere to the lining. In a furnace constructed according to this invention, it will be seen that a stationary hood as herein shown, permits the burners to be disposed so as to direct the flames upon the material, and thereby the portions of the hearth not containing material will not be subjected to the direct heat; and such parts of the hearth directly under the flame are protected by the material being treated. Preferably the degree of heat will be progressive, that is to say, the heat at the center when the material is first fed in will be least, so that the first effect of the heat will be to drive off such constituents of ores as will be driven off by heat, and after such constituents have been driven off the heat will be increased to such an extent as to partially fuse the ore and permit of being agglomerated by the increased heat and the rotation of the hearth.

In order to retain the heat, the edge of the hearth is made substantially circular, and the hood 3 carries a band 26 which will be packed with asbestos or other refractory material 27, so as to form a seal to retain the heat. 28 is a door which will be operated by a weighted latch 29 to open when the table is at a predetermined position to permit the material in the outer groove to be discharged from the furnace. In order to simultaneously adjust the angle of inclination of the hearth 8 and the hood 3, arms 30, 30 31 are provided and a shaft 32 having cams 33 is mounted on the foundation 1, the shaft 32 being operated, as by a hand wheel 34. Between the chute 22 and the stack, and also the bins containing the raw material, flexible joints of any desired construction will be provided, in order to permit of the necessary movement of the hood 3.

The operation of the furnace will be clearly understood from the above description, assuming the material to be fed into the inner recess 15. As the hearth rotates to the left, the material will pass from the recess 15 through the opening 19 into the groove 16, by gravity, and will remain in the flame, in the lower right hand quadrant during its entire travel to the point of discharge. From the groove 16 the material will pass in the same manner after one complete revolution into the next groove, and so on successively, from groove to groove until discharged at the outside. After the sulfur or other volatile constituents are driven off the heat can be increased in any desired groove, to any desired degree so as to partially fuse and thereby nodulize the material. An important advantage of this invention resides in this feature, namely that the heat at different stages of the process can be more accurately controlled than is possible in the kiln type of furnaces most generally used, either the rotary kiln type or the stationary upright type containing baffles and other deflecting devices. Also the travel of the material can be controlled to any degree of speed necessary, and it will also be seen that the peripheral speed of the material will increase from groove to groove. It is desirable to have a higher speed at the time the material is to be agglomerated.

The invention is capable of various modifications and changes in the specific construction herein described and illustrated, without departing from its scope.

Having thus described my invention, I declare that what I claim as new and desire to secure by Letters Patent, is,—

1. A metallurgical furnace comprising a rotary hearth having its axis of rotation inclined to the vertical and provided with a tortuous channel in its surface.

2. Apparatus for feeding comminuted material comprising a rotary hearth provided with a tortuous inclined groove, the inclination of said groove varying as the hearth rotates.

3. A furnace comprising a rotary hearth and a hood covering said hearth to form a heating chamber, said hearth having a tortuous inclined groove, the inclination of which varies as the hearth rotates.

4. A furnace comprising a rotary hearth having a tortuous groove, a fixed hood covering said hearth to form a chamber, means for heating the interior, and means whereby the material travels in the groove by gravity as the hearth rotates.

5. A furnace comprising a hearth having grooves communicating one with another in its surface, said hearth being supported at an angle such that comminuted material will be discharged by gravity from one groove into another as the hearth is rotated, a stationary hood covering said hearth, and means for heating the interior of the furnace.

6. A furnace comprising an inclined rotary hearth having communicating grooves surrounding one another, said openings being disposed out of alinement so that material will be discharged from one groove into an adjacent groove, a stationary hood forming a heating chamber, means for supplying heat, and means for admitting material to the inner groove.

7. A furnace comprising an inclined rotary hearth having communicating grooves surrounding one another, means for supplying material to the inner groove, means for rotating the hearth to cause the material to pass successively through the grooves, and means for heating the material while the hearth is being rotated.

8. A furnace comprising an inclined rotary hearth having a series of grooves communicating one with another, whereby material discharges successively from one groove into another, and means whereby the inclination of the hearth can be varied.

9. A furnace comprising an inclined rotary hearth whereby the material discharges successively from one groove into another, means whereby the inclination of the table can be varied, and means for driving the hearth at varying inclinations.

10. A furnace comprising a pivotally mounted rotary hearth having an inclined tortuous groove, the inclination of which varies as the hearth rotates, and driving means for rotating said hearth, the axis of the driving means being coincident with the axis of pivoting of the hearth.

11. A furnace comprising a pivotally mounted rotary hearth, driving means for rotating said hearth, the axis of the driving means being coincident with the axis of pivoting of the hearth, and a stationary hood mounted to pivot with the hearth.

12. A furnace comprising a pivotally mounted rotary hearth, driving means for rotating the hearth, a stationary hood mounted to pivot with the hearth, and means for heating the chamber between the hood and the hearth.

13. A furnace comprising a rotary hearth having a series of communicating grooves surrounding one another, means for supplying material to the innermost groove, means for tilting the hearth whereby to discharge material from one groove to another, and means whereby the angle of inclination can be varied without affecting the driving connection.

14. A furnace comprising a rotary hearth having its axis of rotation inclined to the vertical and provided with a series of communicating grooves surrounding one another, means for supplying material to the innermost groove, the openings between said grooves being out of alinement whereby the material passes from one groove to the next, a relatively stationary hood, means for heating the interior of the furnace, and means closing the joint between the hearth and hood to confine the heat.

15. A furnace comprising an inclined rotatable hearth having a series of communicating grooves surrounding one another and in different planes, means for feeding material into the inner groove, and means for heating the material in said grooves.

16. A furnace comprising an inclined rotatable hearth having a series of communicating grooves surrounding one another and in different planes, means for feeding material into the inner groove, and means for heating the material in said grooves at different temperatures.

17. A furnace comprising an inclined rotatable hearth having a series of communicating grooves surrounding one another in different planes, and a relatively stationary hood covering the hearth.

18. A furnace comprising an inclined rotatable hearth having a series of communicating grooves surrounding one another in different planes, a relatively stationary hood inclosing the hearth, driving means for the hearth, and means for varying the inclination of the hearth and the hood without affecting the driving connection.

19. A furnace comprising an inclined rotatable hearth having a series of communicating grooves surrounding one another, of a relatively stationary hood, and means for heating the material in said grooves at respectively different temperatures.

20. A furnace comprising a rotary hearth having its axis of rotation inclined to the vertical, a tortuous groove therein, a stationary inclosing hood, and means for heating the interior.

21. A furnace comprising a rotary hearth havings its axis of rotation inclined to the vertical, a tortuous groove therein, a stationary inclosing hood, and means carried by the hood for heating the interior.

In testimony whereof I affix my signature, in presence of two witnesses.

JOHN E. JONES.

Witnesses:
JULIAN S. WOOSTER,
GEO. A. HOFFMAN.